Feb. 6, 1945. W. E. GEDDES 2,368,824
HATCH STRUCTURE FOR REFRIGERATOR CARS
Filed Jan. 9, 1943 3 Sheets-Sheet 1
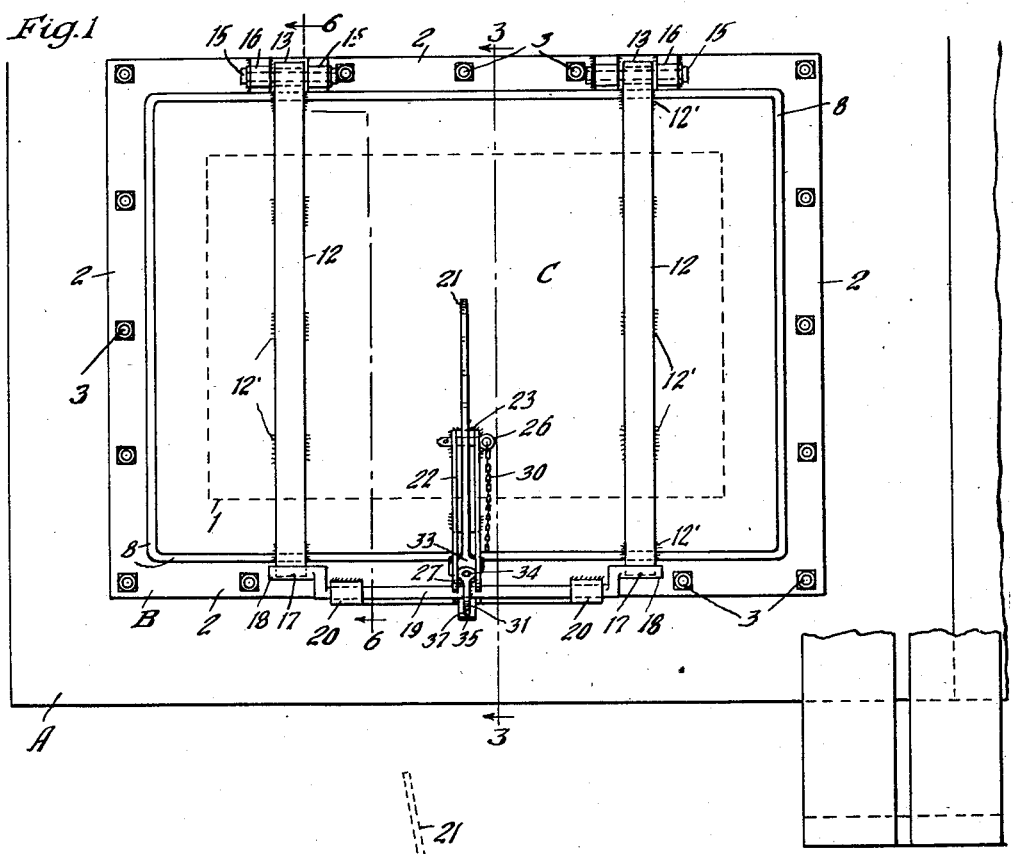
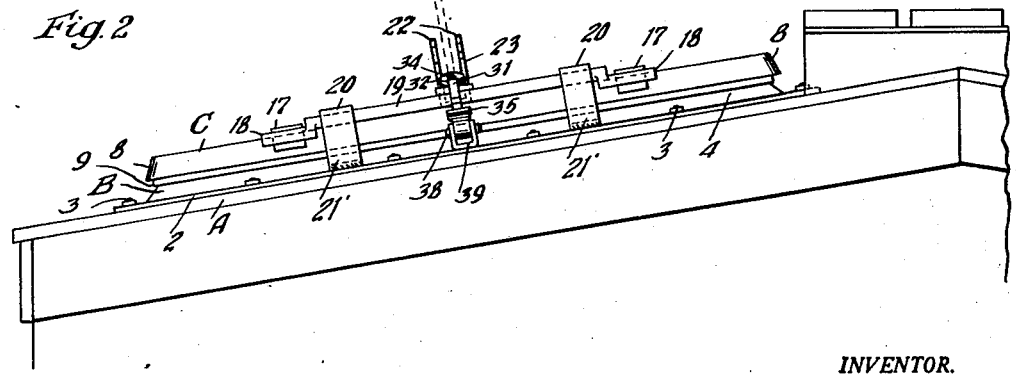
INVENTOR.
William E. Geddes
BY George D. Haight
Atty.

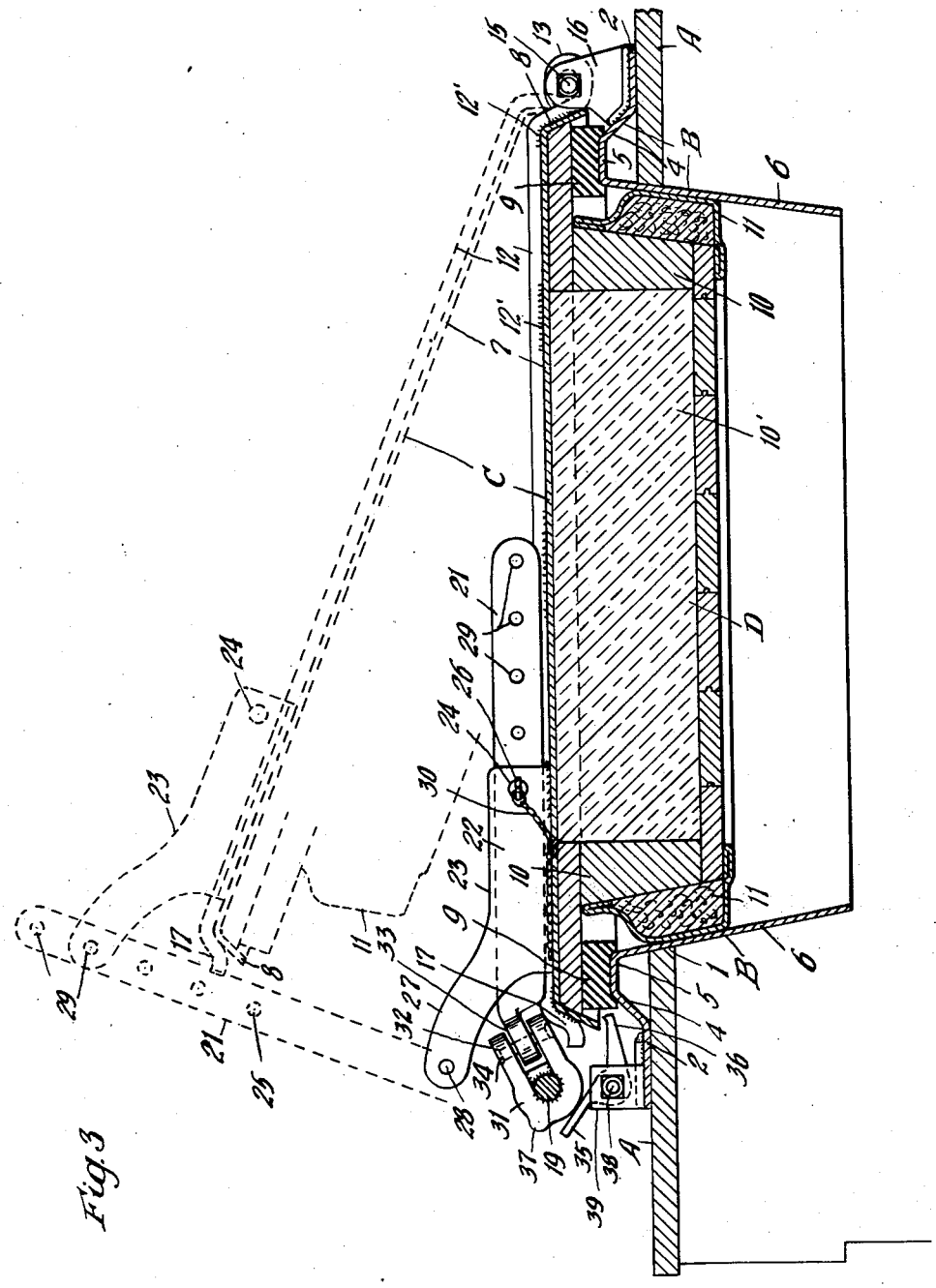

Feb. 6, 1945. W. E. GEDDES 2,368,824
HATCH STRUCTURE FOR REFRIGERATOR CARS
Filed Jan. 9, 1943 3 Sheets-Sheet 3
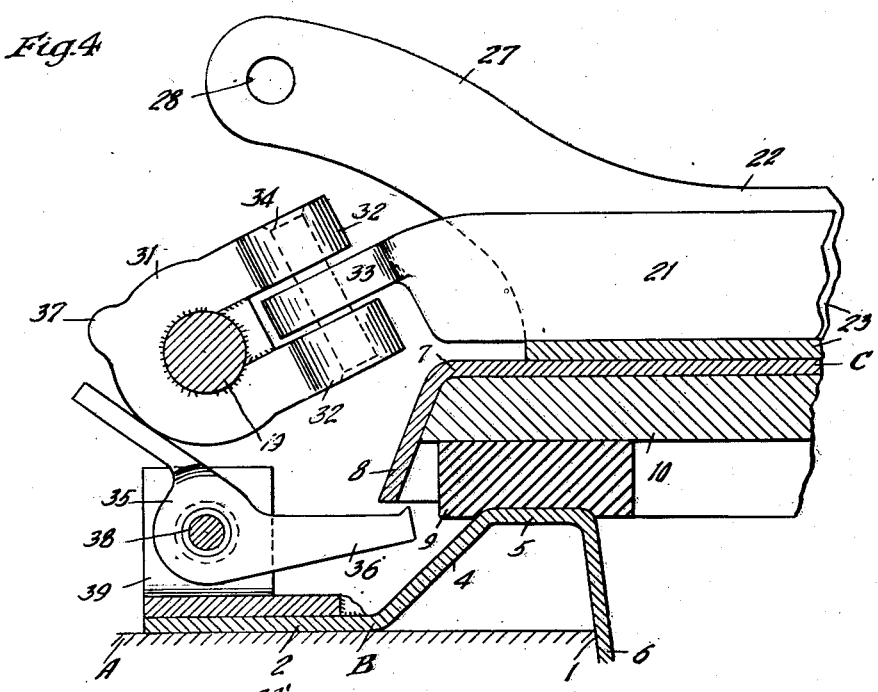
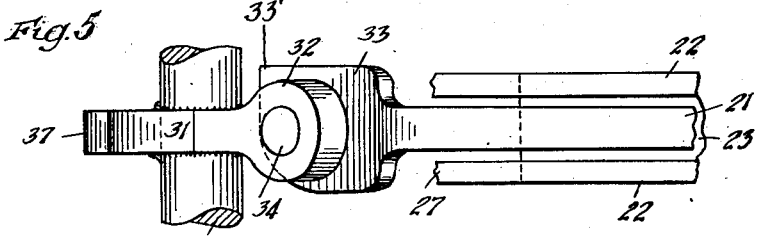
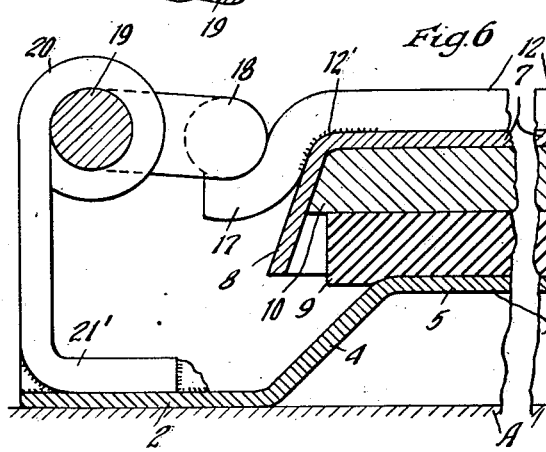
Inventor
William E. Geddes
By George I. Haight
Atty.

Patented Feb. 6, 1945

2,368,824

UNITED STATES PATENT OFFICE 2,368,824

HATCH STRUCTURE FOR REFRIGERATOR CARS

William E. Geddes, Chicago, Ill., assignor to General American Transportation Corporation, Chicago, Ill., a corporation of New York Application January 9, 1943, Serial No. 471,914

2 Claims. (Cl. 98—7)

My invention relates to improvements in hatch construction for refrigerator cars, and more particularly, though not necessarily, to a metal hatch frame and cover of the type which has the hatch plug permanently attached to the cover.

One of the objects of the invention is to provide a hatch structure having a cover in hinged relation to the hatch frame but provided with sufficient lateral freedom of movement to permit the plug carried by the cover to properly seat in closed position in the hatch frame.

Another object is to provide locking mechanism which will securely lock the cover in closed position without warping the cover and which is so arranged that variations in manufacture and fabrication of the parts will minimize the difficulty in assembling the mechanism on the car.

Another object is to provide a locking mechanism having an operating lever which can be utilized as a locking and sealing device for the cover, as a supporting arm for holding the cover in any one of several partially open positions for ventilating purposes, and which can be swung clear of the cover and folded down upon the car clear of all safety appliances on the car roof.

Another object is to provide a hatch construction in which the various parts attached to the cover are welded to eliminate bolt or nut holes through which leakage might occur.

Another object is to provide a double seal against leakage between the cover and hatch frame.

Another object is to provide a releasing device to initiate the opening of the cover in the event that the cover and plug carried thereby become frozen in closed position.

Other objects of the invention will appear from the following description and accompanying drawings which illustrate one embodiment of the invention.

Referring to the drawings,

Fig. 1 is a top plan view of a portion of a refrigerator car roof and covered hatch embodying my improvements;

Fig. 2 is an end view of the structure shown in Fig. 1;

Fig. 3 is an enlarged vertical section on the line 3—3 of Fig. 1, illustrating the hatch cover in closed position and in dotted lines in an open ventilating position;

Fig. 4 is an enlarged detail vertical section of the left-hand portion of the structure shown in Fig. 3, illustrating the cam release mechanism;

Fig. 5 is a top plan view of the structure shown in Fig. 4; and

Fig. 6 is an enlarged vertical section on line 6—6 of Fig. 1, with the central portion of the hatch cover broken out to foreshorten the view, and showing the cover locking cams and the hinge construction.

The drawings illustrate a portion of a refrigerator car roof A having an opening 1 surrounded by a rectangular hatch frame B. The hatch frame has an outer horizontal flange 2 which is secured to the car roof by bolts 3 or any other suitable means. The portion of the hatch frame between the flange and the margin of the roof opening is raised above the plane of the flange, thus forming a bead 4 to prevent the water from entering the hatch beneath the cover and to provide a seat for the cover, the top 5 of the bead being formed flat for this purpose. From the bead the frame extends downwardly through the roof opening to provide walls 6 for the hatch opening, and these walls are tapered downwardly to provide a wedge fit for the plug carried by the cover.

The hatch cover C is pan-shaped and is formed of a flat imperforate steel sheet 7 having a downturned angular flange 8 around its margins. The cover is large enough to overlie the hatch frame bead 4 and carries on its underside a suitable rubber gasket 9 which seats upon the flat top of the bead when the cover is closed to provide a seal. The cover carries an insulating plug D which in the present structure is permanently attached to the cover and extends down into the hatch frame to seat itself against the walls thereof. The plug is made of a frame 10 of wood secured to the underside of the cover plate and filled with suitable insulating material 10'. The exterior of the frame is tapered to correspond to the hatch frame walls and is spaced therefrom and carries a heavy padding 11 of suitable material forming a gasket which seals the space between the plug and hatch frame walls and which is resilient to adjust itself to the wall faces. This gasket pad, in conjunction with the rubber gasket 9, forms a double seal against leakage when the cover is in closed position.

The cover is hinged at one side and locked at the other, and is adapted to be handled manually to place it in open or close or intermediate positions. Hinge straps 12 extend across the cover plate and are secured to the top surface thereof by welding 12' at intervals, instead of rivets, so that holes, and possible leakage therethrough, in the cover plate are eliminated. These hinge straps or bars also provide reinforcement against bending or warping of the cover plate.

The ends of the strap extend beyond the side of the cover and are formed as hinge members 13 provided with holes or slots 14 for the hinge bolts 15. The hinge bolts are carried in hinge butt members 16 which are secured to frame flange 2 by welding, two of these hinge butts being provided for each hinge member 13 between which it is positioned. As shown more clearly in Fig. 6, the slots 14 are elongated so as to allow some play between the hinge members and the bolts, which enables the cover to hinge properly and at the same time securely hold the cover in vertical pressure engagement with the frame, and yet provide sufficient lateral freedom of movement in the plane of itself to equalize and adjust the plug in its seat in the hatch frame as the cover is being forced closed.

The opposite ends of the hinge straps project beyond the edge of the cover and are curved to form lugs 17 for engagement by locking cams 18 which are part of the closing and locking mechanism for the cover. The cams are formed as offset or eccentric members at the ends of a locking bar or shaft 19 which is rotatably mounted in bearings 20 on the brackets 21'. The brackets are secured by welding to the flange 2 of the hatch frame. The shaft and cams are positioned on the frame adjacent the edge of the cover and clear of the cover to permit the cover to be handled manually, and yet in proper relationship to rotate the cams 18 into or out of engagement with the lugs to lock or release the cover. The cams and lugs are so related that the rotation of the shaft applies a clamping pressure to force the cover into firmly closed position against the gaskets.

The cams and cam shaft are operated by a locking lever or handle 21 which swings in a vertical plane lengthwise of the cover from a locking position in which it is parallel with and above the hatch cover, to a position entirely clear of the cover so that the cover may be manually swung upon its hinges to any desired position. In its locking position, the lever is located between the parallel leaves or walls 22 of a U-shaped keeper 23 which is secured by welding to the upper surface of the hatch cover. The keeper walls have aligned holes 24 therein which register with a hole 25 in the lever, these holes being provided so that a sealing or locking pin 26 can be inserted therein for sealing or locking the lever in the closed position of the latch cover.

The keeper walls have extensions 27 which overhang the cam shaft and are provided with aligned holes 28. These holes register with any one of a series of holes 29 in the lever into which a pin may be inserted to support the hatch cover in any one of several partially open or intermediate positions for ventilating purposes, as indicated in dotted lines in Fig. 3. The pin used for this purpose may be the same pin 26 used for a sealing pin as above described. A suitable chain 30 long enough to permit the pin to reach the several positions is attached to the pin and the hatch frame to prevent loss of the pin.

The locking lever is jointed adjacent the shaft so that the lever can be swung in a plane transverse to its other plane of movement for the purpose of enabling the lever to be swung sideways and folded or laid down upon the car roof alongside the hatch. Thus the lever can be removed from the danger of falling across handholds or other safety appliances on the roof of the car. The joint in the lever in the present structure, as shown more clearly in Figs. 4 and 5, is made by forming the hub 31 with spaced arms 32 between which the end 33 of the lever arm is positioned and fulcrumed by means of a pivot bolt 34. The end of the lever is provided with a shoulder 33' (Fig. 5) acting to engage the hub to prevent the lever being swung in one direction, thus insuring its being folded in the proper direction.

It sometimes occurs that the hatch plug freezes in closed position in the hatch frame and becomes very difficult to open. In order to overcome this condition, I provide a releasing device which enables the hatch cover to be forced with sufficient power to break the frozen condition preparatory to opening the cover. In the present structure, this device consists of a prying lever 35, one arm 36 of which extends under the edge of the cover flange 8 and the other of which extends into position to be engaged by a cam 37 on the hub of the locking lever. These parts are so related that in the movement of the locking lever upwardly, the cam rotates the prying lever and causes its arm 36 to apply a powerful upward force to the hatch cover. The prying lever 35 is carried on a shaft 38 which is supported in a bracket 39 secured by welding to the hatch frame flange 2.

I claim:

1. In a hatch structure of the class described, the combination of a hatch frame having walls defining a hatch opening, a cover for said opening overlying the frame in closed position and including a sheet metal plate, a pair of reinforcing straps spaced apart and extending lengthwise of the cover and secured to said sheet metal, said straps extending beyond the margin of the cover at one end to form hinge members and at the other end to form lugs, a rotatable shaft mounted on the frame adjacent said lugs, offset arms mounted on the ends of said shaft forming cam members to engage the lugs and force the cover in closed position firmly against the frame, and a lever for rotating said shaft positioned between said straps and adapted to swing in a plane lengthwise of the cover, said lever comprising a hub member mounted on the shaft, and an arm fulcrumed on the hub to swing in a plane transverse to said other plane of movement said arm being adapted to overlie the cover in closed position, and a U-shaped keeper on the cover adapted to receive said arm.

2. In a hatch structure of the class described, the combination of a hatch frame having walls defining a hatch opening, a cover for said opening overlying the frame in closed position and including a sheet metal plate, a pair of parallel reinforcing straps spaced apart and extending lengthwise of the cover and secured to said sheet metal, said straps extending beyond the margin of the cover at one end to form hinge members and at the other end to form offset lugs, a rotatable shaft mounted on the frame adjacent said lugs, and having offset arms at its ends forming cam members to engage the lugs and force the cover in closed position firmly against the frame, and a lever for rotating said shaft and adapted to swing in a plane lengthwise of the cover, said lever comprising a hub member mounted on the shaft and an arm fulcrumed on the hub to swing in a plane transverse to said other plane of movement and to overlie the cover in closed position, a channel-shaped keeper on the cover for receiving said arm, and means on said cover for connection with the arm in an upright position to hold the cover in any one of several open positions.

WILLIAM E. GEDDES.